United States Patent
Holland

[11] 3,881,764
[45] May 6, 1975

[54] DUMP BED

[75] Inventor: John H. Holland, Norman, Okla.

[73] Assignee: The J. H. Holland Company, Norman, Okla.

[22] Filed: Apr. 12, 1973

[21] Appl. No.: 350,638

[52] U.S. Cl. ............................... 296/28 D; 296/56
[51] Int. Cl. ............................................ B62d 33/00
[58] Field of Search. 298/22 R, 22 P, 23 R, 23 MD, 298/23 C, 23 D, 19 R; 296/28 D, 56

[56] References Cited
UNITED STATES PATENTS

| | | | |
|---|---|---|---|
| 2,720,877 | 10/1955 | Harder | 296/28 D |
| 3,412,883 | 11/1968 | Birdsall | 298/22 P |
| 3,440,764 | 4/1969 | Cover | 296/56 |

FOREIGN PATENTS OR APPLICATIONS

| | | | |
|---|---|---|---|
| 1,264,852 | 12/1963 | Germany | 298/23 R |
| 157,260 | 12/1956 | Sweden | 298/23 R |

Primary Examiner—Robert J. Spar
Assistant Examiner—Ross Weaver
Attorney, Agent, or Firm—Hubbard, Thurman, Turner & Tucker

[57] ABSTRACT

In a dump bed, the side portions of the rear end of the floor are tapered inwardly, and the rear ends of the side walls are tapered upwardly. Downwardly, inwardly, and forwardly tapered rear corner walls extend between the rear ends of the side walls and the adjacent side portions of the rear end of the floor, thereby defining the inner portion of a discharge chute and facilitating observation of particulate material flowing from the dump bed. The rear corner walls extend to spaced apart rear edges which cooperate with the central portion of the rear end of the floor to define a discharge opening. A series of interconnected resilient flanges extend rearwardly from the discharge opening to define the outer portion of the discharge chute.

The dump bed further includes a tailgate adapted to close the discharge opening. A pair of links pivotally interconnect the opposite upper ends of the tailgate and the adjacent upper rear ends of the side walls. A pair of bell cranks are pivotally connected to the upper rear ends of the side walls and to a pair of ears extending outwardly from the opposite upper ends of the tailgate. Hydraulic cylinders are connected between the side walls and the bell cranks and function to pivot the tailgate along an elliptical path, whereby the discharge chute is opened to any desired extent. One of the ears of the tailgate is provided with a flange which facilitates direct observation of the pivotal positioning of the tailgate.

13 Claims, 8 Drawing Figures

DUMP BED

BACKGROUND AND SUMMARY OF THE INVENTION

This invention relates to dump beds, and more particularly to a dump bed which affords precise control over the rate at which material is discharged during dumping.

The co-pending application of John H. Holland, Ser. No. 208,727, filed Dec. 16, 1971, for PARTICULATE MATERIAL DELIVERY TRAILER discloses a system wherein particulate material is transported both in a dump truck and in a trailer towed by the dump truck. The trailer includes a centrally disposed, relatively large hopper adapted to receive and transport particulate material, and a relatively small hopper positioned at the front of the trailer and adapted to receive particulate material from the dump truck. An endless conveyor is mounted for movement around a course extending through the bottom portions of both hoppers and functions to unload particulate material from the hoppers and to discharge the particulate material from the extreme rear end of the trailer.

In the use of the system, particulate material is received both in the large hopper of the trailer and in the dump bed of the dump truck. The dump truck is then utilized to tow the trailer to the unloading site. The trailer is provided with an extendable tongue which permits transportation of the particulate material with maximum separation between the two loads. This is highly advantageous in increasing the amount of particulate material which may be transported within the limits imposed by bridge and highway regulations.

At the unloading site the tongue of the trailer is retracted such that the dump bed of the dump truck is positioned directly over the small particulate material receiving hopper of the trailer. The conveyor of the trailer is then actuated to unload the particulate material from the large hopper of the trailer. In suitable instances, the particulate material may be discharged from the trailer directly into a lay down machine, or similar apparatus.

When the large hopper of the trailer has been unloaded, the dump bed is raised so that particulate material from the dump bed is received in the small hopper of the trailer. During this action the operation of the conveyor is continued, so that the particulate material from the dump truck is transported through the trailer and is discharged from the trailer in the same manner as the particulate material from the large hopper of the trailer. After all the particulate material from the dump truck has been unloaded, the dump truck is used to return the trailer back to the original location, whereupon the foregoing cycle is repeated.

The present invention relates to a dump bed which is particularly adapted for use in conjunction with the particulate material delivery trailer disclosed and claimed in the above-identified Holland application. Thus, in accordance with the broader aspects of the invention, a dump bed is provided with a discharge chute whereby particulate material flowing from the vehicle during dumping is funneled into a centrally located, relatively narrow stream. The dump bed further includes a tailgate which is actuated by fluid powered cylinders in order to control the extent to which the discharge chute is opened during dumping. By this means the discharge of material from the dump bed is positively metered, regardless of whether the material is delivered to the above-described particulate material delivery trailer or otherwise.

In accordance with more specific aspects of the invention, the dump bed comprises a floor including a rear end having inwardly tapered side portions which are separated by a transversely extending central portion. A front wall and a pair of side walls extend from the floor, and the side walls have upwardly tapered rear ends. A pair of rear corner walls are provided, each extending between the upwardly tapered rear end of one of the side walls and the adjacent inwardly tapered side portion of the rear end of the floor. The rear corner walls define the inner portion of the discharge chute and extend to spaced apart, inwardly tapered rear edges positioned substantially inwardly from the side walls and aligned with the central portion of the rear end of the floor for cooperation therewith to define a discharge opening. A series of interconnected flanges are secured to the rear edges of the rear corner walls and to the central portion of the rear end of the floor and extend generally outwardly therefrom to form the outer portion of the discharge chute.

As mentioned previously, the foregoing construction provides a dump bed including a discharge chute which funnels material flowing from the dump bed into a relatively narrow stream that is centrally located relative to the dump bed. The use of the invention also facilitates operator control during unloading by providing complete visibility through the open areas formed by the rear corner walls. By means of the rear view mirrors of a truck incorporating the dump bed and these open areas, the operator retains complete visibility of the material being unloaded regardless of the angle of inclination of the dump bed. This is particularly important when the material is being unloaded into a particulate material handling trailer of the type discussed above.

In accordance with still another aspect of the invention, the tailgate of the dump bed is substantially identical in shape to the discharge opening of the discharge chute. A tubular structural member extends along the top of the tailgate and a pair of ears extend from the tubular member. The tailgate is supported by a pair of links each pivotally connecting the tubular structural member to the upper rear end of the adjacent side wall. The tailgate is actuated by a pair of hydraulic cylinders located on opposite sides of the dump bed and connected to the tailgate by means of bell cranks. The bell cranks are also pivotally connected to the ear extending from the tubular structural member of the tailgate and the rear end of the adjacent side wall.

By means of the foregoing pivotal connection, the tailgate follows an elliptical path under the section of the hydraulic cylinders. This has been found to be advantageous in providing precise control over the discharge rate of particulate material from the dump bed. Moreover, the elliptical path is useful in facilitating restriction and/or termination of flow with the dump bed in a raised condition.

Still another aspect of the invention comprises a member mounted on the tailgate for pivotal movement therewith under the action of the hydraulic cylinders and positioned for direct observation by the operator of the dump truck. This is also useful in affording control over the unloading of particulate material from the dump bed, in that the operator can immediately ascertain the pivotal positioning of the tailgate without leaving the operator's compartment. This feature in conjunction with the visibility afforded by the use of downwardly, inwardly, and forwardly tapered rear corner walls in the discharge chute provides the operator with substantially complete control over the rate at which material is discharged from the dump bed.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
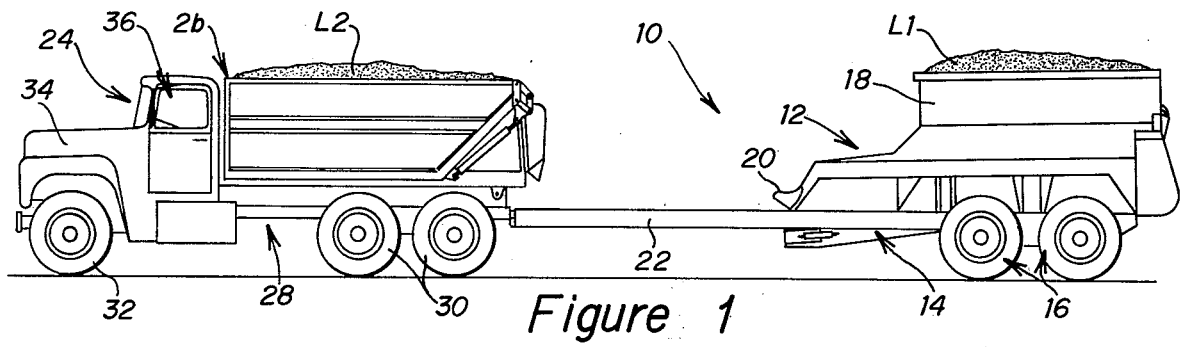
FIGS. 1 and 2 are illustrations of the use of the invention.
Figure 2:
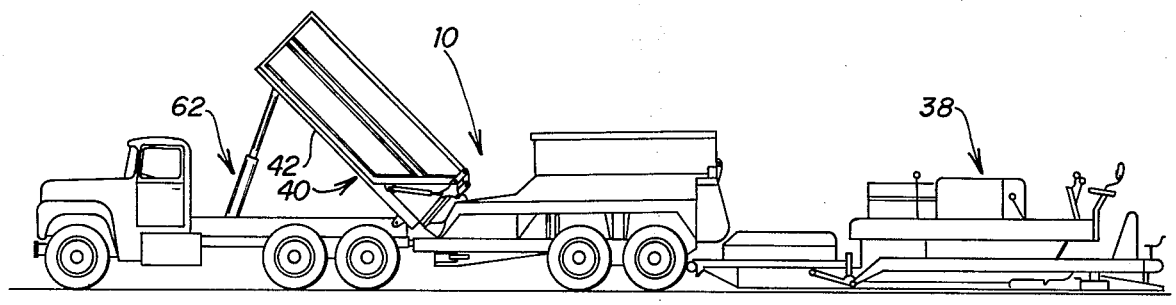
Figure 5:
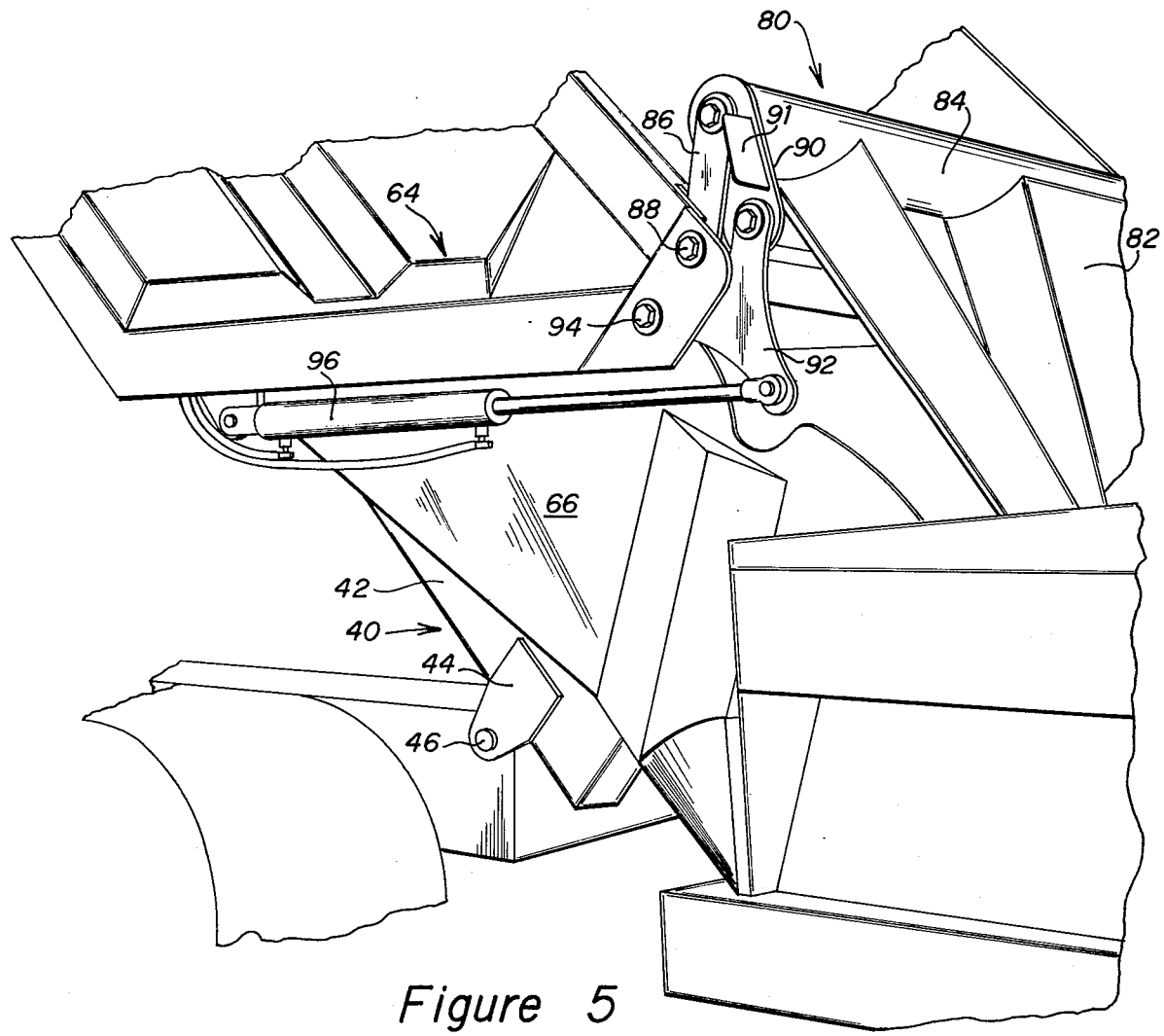
FIG. 5 is an enlargement of a portion of FIG. 4.

Referring now to the drawings, and particularly to FIGS. 1 and 2 thereof, there is shown a particulate material handling system 10 including a particulate material delivery trailer 12 of the type disclosed and claimed in the co-pending application of John H. Holland, filed Dec. 16, 1971, Ser. No. 208,727. The trailer 12 comprises a chassis 14 which is supported on a plurality of wheels 16. A relatively large hopper 18 is supported on the chassis 14 directly over the wheels 16 and is adapted to receive a load of particulate material L1. A relatively small hopper 20 is located at the front end of the chassis 14, and an endless conveyor (not shown) is supported for movement around a course extending through the bottom portions of the hoppers 20 and 18. The conveyor is therefore adapted to unload particulate material from the hoppers and to discharge particulate material from the extreme rear end of the trailer 12. The trailer is further provided with an extendable tongue 22.

The extendable tongue 22 is utilized to connect the trailer 12 to a dump truck 24. The dump truck 24 includes a dump bed 6 incorporating the present invention and adapted to receive and transport a load of particulate material L2. The dump truck further includes a chassis 28 which is supported on rear drive wheels 30 and front steering wheels 32. An engine (not shown) is mounted at the front end of the chassis and is enclosed by a hood 34. The truck further includes an operator's compartment or cab 36 which in the case of the dump truck shown in the Drawings is located behind the engine and ahead of the dump bed 26. It will be understood, however, that the present invention is equally adaptable for use with dump trucks wherein the engine-cab-dump bed arrangement is other than that illustrated in the drawings.

In the use of the particulate material handling system 10, particulate material is loaded into the hopper 18 of the trailer 12 and into the dump bed 26 of the dump truck 24 at a receiving location. Thereafter the dump truck 24 is utilized to tow the trailer 12 to a particulate material delivery location. During transportation of the particulate material, the tongue 22 of the trailer 12 is preferably extended so that the trailer and the dump truck are positioned as shown in FIG. 1. This provides maximum separation between the loads of particulate material L1 and L2, and therefore maximizes the amount of particulate material that may be transported within the limits imposed by bridge and highway regulations.

At the delivery site, the dump truck 24 is utilized to position the trailer 12 in accordance with the requirements of the particular delivery operation. For example, the trailer 12 is adapted to deliver particulate material directly to a conventional lay down machine 38. The tongue 22 is then retracted, and the conveyor of the trailer is actuated to unload the particulate material from the hopper 18. After the hopper 18 is unloaded, the dump bed 26 is raised, whereby the load of particulate material L1 is gradually discharged into the hopper 20 of the trailer 12. The conveyor of the trailer is operated continuously during the dumping operation so that particulate material received in the hopper 20 from the dump truck 24 is transported through the trailer 12 and is discharged from the extreme rear end thereof in the same manner as the particulate material from the hopper 18. After all of the particulate material has been unloaded, the dump truck 24 may be operated to return the trailer 12 to the particulate material receiving location.

Figure 3:
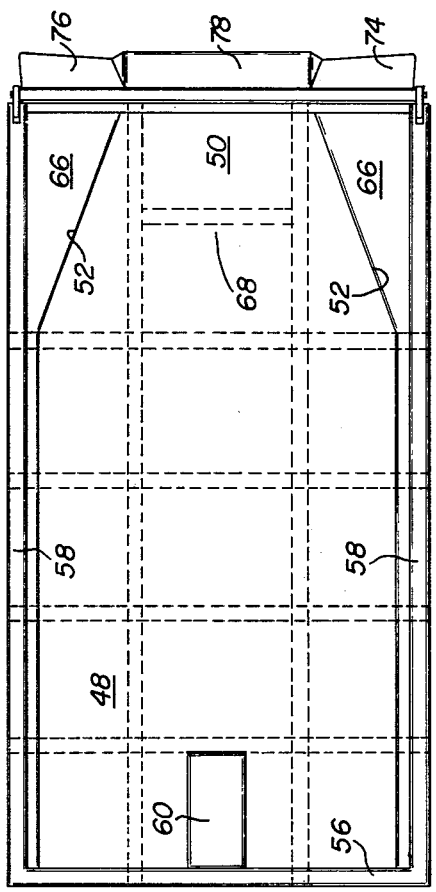
FIG. 3 is a top view of a dump bed incorporating the invention.
Figure 4:
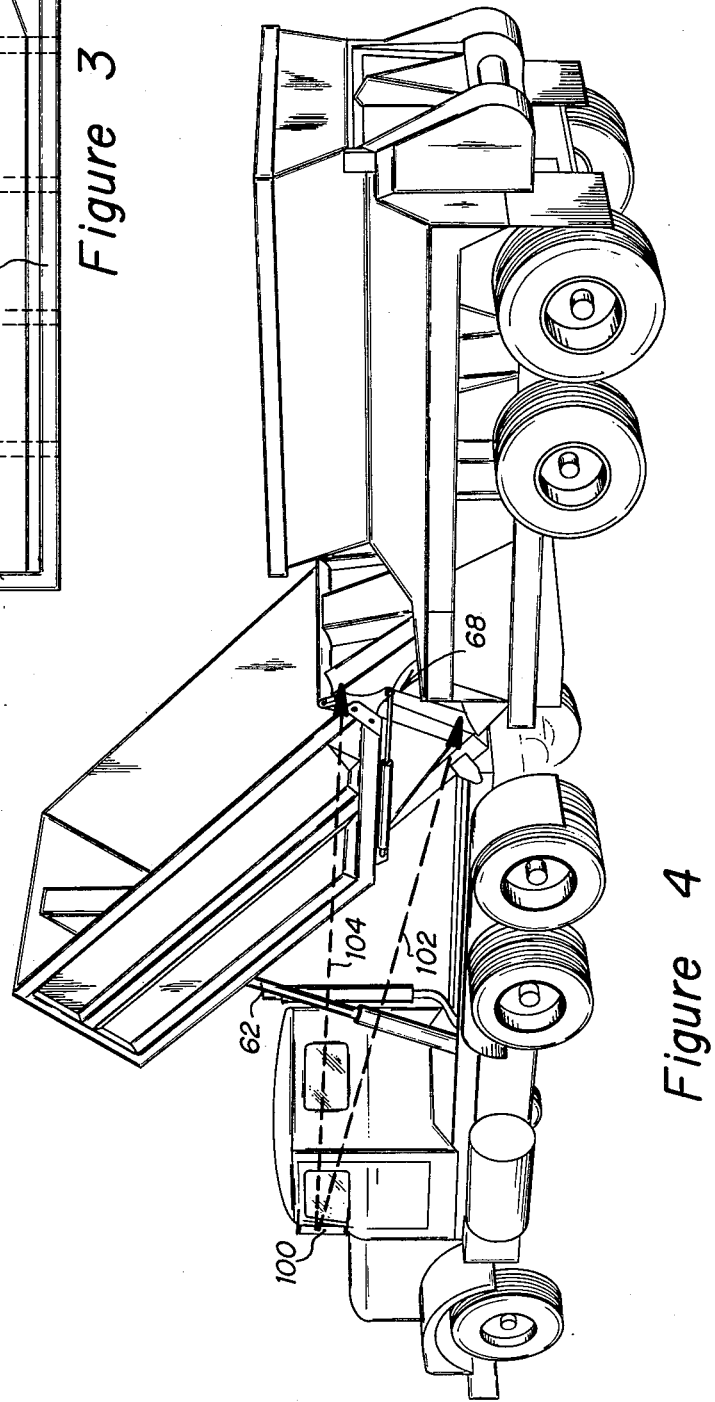
FIG. 4 is a rear perspective view illustrating the use of the invention.

The structural details of the dump bed 26 are illustrated in FIGS. 3 and 4. The dump bed includes a longitudinally extending subframe 40 comprising a pair of spaced apart beams 42 each extending the entire length of the dump bed. The rear end of the subframe 40 is pivotally connected to the rear end of the chassis 28 of the dump truck 24 by means of ears 44 depending from the beams 42 and pivot pins 46 extending through the ears 44 and the chassis of the truck.

A floor 48 is supported on the subframe 40 and extends generally parallel to the beams 42. The floor 48 includes a rear end 50 comprising opposed inwardly tapered side portions 52 separated by a transversely extending central portion 54. A front wall 56 and a pair of side walls 58 extend from the floor 48 to define the front portion of the dump bed 26. The front wall 56 includes a housing 60 which receives the upper portion of a hydraulic cylinder 62. As is best shown in FIGS. 2 and 4, the hydraulic cylinder 62 is adapted for selective actuation to pivot the dump bed 26 between a generally horizontal load receiving and transporting position and an inclined dumping position.

The side walls 58 each have an upwardly inclined rear end 64. A pair of rear corner walls 66 are provided, each extending between the upwardly inclined rear end of one of the side walls and the adjacent inwardly tapered side portion 52 of the rear end 50 of the floor 48. The rear corner walls 66 thus taper downwardly, inwardly, and forwardly to define the inner portion of a particulate material discharge chute 68.

Figure 8:
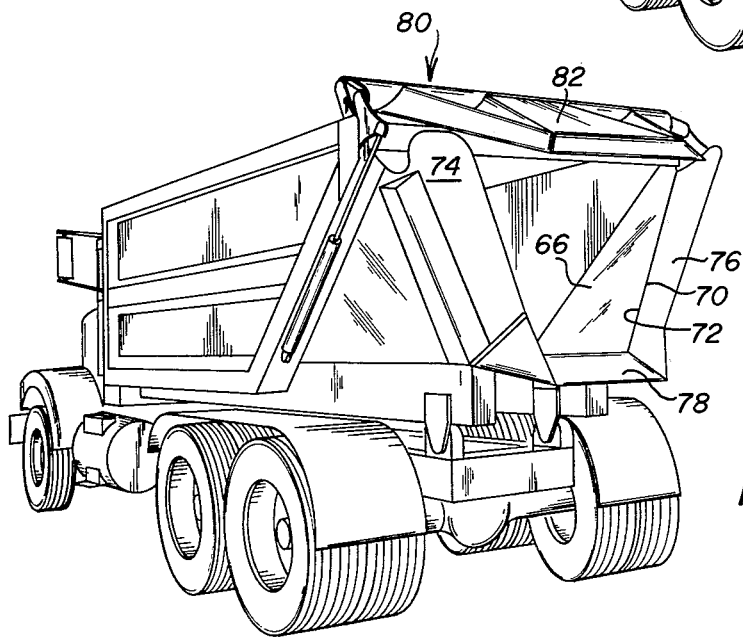

As is perhaps best shown in FIG. 8, the rear corner walls 66 extend to inwardly tapered rear edges 70 positioned substantially inwardly from the side walls 58 and aligned with the central portion 54 of the rear end 50 of the floor 48 to define a discharge opening 72. A series of three interconnected flanges 74, 76 and 78 are secured to the rear edges 70 of the rear corner walls 66 and to the central portion 54 of the rear end 50 of the floor 48 and extend generally outwardly therefrom. The flanges 74, 76 and 78 are advantageously formed from a flexible material such as rubber and serve to define the outer portion of the discharge chute 68.

The dump bed 26 further includes a tailgate 80. The tailgate 80 comprises an imperforate lower portion 82 which is substantially identical in configuration to the discharge opening 72 of the discharge chute 68. The tailgate 80 is therefore adapted for cooperation with the discharge opening 72 to close the discharge chute 68 and thereby effectively seal the rear end of the dump bed 26.

As is best shown in FIG. 3, a tubular structural member 84 extends across the top of the tailgate 80. A pair of links 86 are provided for pivotally connecting the opposite ends of the structural member 84 to the adjacent upper rear ends of the side walls 58 at points 88. An ear 90 extends outwardly from each end of the structural member 84. The ear 90 on the operator's side of the dump truck 24 is provided with an outwardly extending flange 91.

A pair of bell cranks 92 are pivotally connected to the ears 90, and are in turn pivotally connected to the upper rear ends of the side wall 58 at points 94. A pair of hydraulic cylinders 96 are connected between the side walls 58 and the bell cranks 92. The hydraulic cylinders 96 are connected in parallel and are therefore adapted for simultaneous actuation to control the pivotal relationship of the tailgate 80 with respect to the discharge chute 68.

Figure 6:
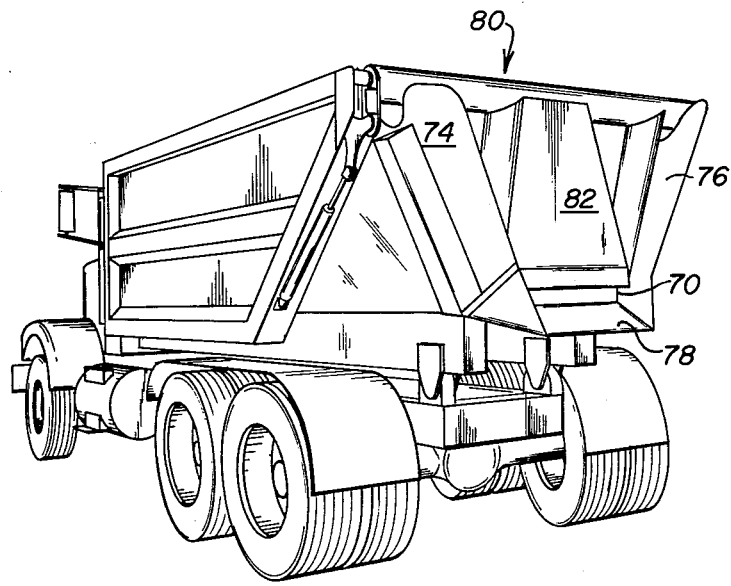
FIGS. 6, 7 and 8 are similar rear perspective views of the dump bed shown in FIG. 3 which illustrate various pivotal positions of the tailgate of the dump bed.
Figure 7:
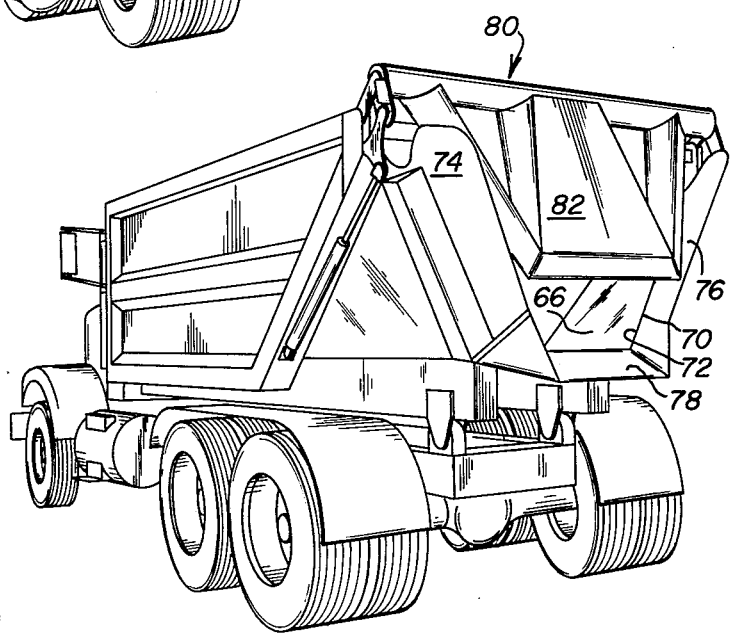

The use of the links 86, the ears 90, and the bell cranks 92 to pivotally support the tailgate 80 causes the tailgate 80 to follow the elliptical path illustrated in FIGS. 6, 7 and 8 as it is opened relative to the discharge chute 58 under the action of the hydraulic cylinder 96. This has been found to be highly advantageous from at least two standpoints. First, the elliptical motion of the tailgate 80 facilitates more accurate control over the extent to which the discharge chute 68 is opened and thereby permits more precise metering of the rate of flow of particulate material from the dump bed 26. The elliptical path of the tailgate 80 also provides a "slicing" action of the tailgate relative to material flowing from the dump bed. This facilitates restriction and/or termination of the flow of material from the dump bed with the bed in a raised position.

Additional highly advantageous features of the present invention will be best understood by referring to FIG. 4. The operator's compartment 36 of the dump truck 24 is provided with a conventional rear view mirror 100 positioned for ready observation by an operator situated within the compartment 36. By means of the rear corner wall 66 on the operator's side of the dump bed 26, a direct line of sight 102 is provided from the mirror 100 to the particulate material flowing from the dump bed. This is highly advantageous in facilitating control over the rate at which material is discharged from the dump bed, and is particularly important when the dump truck 24 is utilized to discharge material into the hopper 20 of the trailer 12. It will be understood that a similar line of sight is provided on the opposite side by means of the right-hand rear view mirror which is mandatory on dump trucks. There is also provided a direct line of sight 104 extending from the mirror 100 to the flange 91 of the ear 90 on the operator's side of the dump bed 26. This permits direct observation by the operator of the pivotal positioning of the tailgate 80 relative to the discharge chute 68, and therefore further facilitates control over the rate at which material is discharged from the dump bed 26.

It will therefore be understood that the use of the present invention results in numerous advantages over the prior art. Thus, by means of the invention, a dump bed is provided with a discharge chute serving to funnel material flowing from the dump bed into a relatively narrow, centrally located stream. This is advantageous not only when the dump bed is utilized to discharge material into the hopper of a particulate material delivery trailer or similar apparatus, but also when the dump truck is utilized in windrowing, stock piling, and similar operations. The use of the invention also facilitates very precise control over the rate at which particulate material is discharged from the dump bed. The latter result is obtained by means of two very important features of the invention. First, the tailgate is mounted for movement in an elliptical path, thereby facilitating both more precise control over the extent to which the discharge chute is opened and restriction and/or termination of the flow with the bed in a raised condition. Secondly, a dump bed incorporating the invention provides direct observation both of the material flowing from the bed and of the pivotal positioning of the tailgate. This further facilitates precise control over the rate at which material is discharged.

Another advantage deriving from the use of the present invention involves the fact that with the dump bed raised, the downwardly, inwardly and forwardly tapered rear corner walls permit the dump truck to be angularly disposed relative to the trailer, thereby facilitating the paving of small radii. These walls also permit the turning of sharp corners when the tongue of the trailer is retracted and the bed is lowered. This in turn facilitates the use of a wider hopper at the front of the trailer, thereby substantially reducing spillage and waste in the use of the system.

Still another advantage relates to the dumping of material into the front hopper of the trailer with the dump bed partially raised. In these situations the construction of the discharge chute funnels the material into a relatively narrow stream which is centrally disposed relative to the dump bed and the hopper. At the same time the construction of the tailgate and the visibility features of the dump bed afford precise control over the rate at which material is discharged from the dump bed into the hopper.

Although particular embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. In a dump bed of the type including a floor, opposed side walls, and a front wall which cooperate to define the front portion of the dump bed, the improvement comprising:
   a pair of downwardly, inwardly, and forwardly tapering rear corner panels extending between upwardly tapered rear ends of the side walls and inwardly tapered side portions of the rear end of the floor to define the inner portion of a discharge chute located at the rear portion of the dump bed;

said panels extending to spaced apart inwardly tapered rear edges positioned substantially inwardly from the side walls and aligned with the central portion of the rear end of the floor for cooperation therewith to define a discharge opening of the discharge chute; and a tailgate substantially identical in shape to the discharge opening and supported at the upper rear ends of the side walls for selective pivotal movement to open and close the discharge chute.

2. The dump bed according to claim 1 further including a plurality of flanges secured to the rear edges of the opposed, tapered panels and to the rear end of the floor and extending generally rearwardly therefrom to define the outer portion of the discharge chute.

3. The dump bed according to claim 1 further including at least one fluid powered cylinder for selectively pivoting the tailgate relative to the discharge opening and for locking the tailgate in any desired pivotal relationship with respect to the discharge opening.

4. The dump bed according to claim 3 further characterized by means supporting the tailgate on the side walls for movement in an elliptical path under the action of the fluid powered cylinder.

5. The dump bed according to claim 1 further including means for pivotally supporting the tailgate on the upper ends of the side walls which comprises:

a structural member extending along the top of the tailgate;

opposed links pivotally connecting the structural member at the top of the tailgate to the upper rear ends of the side walls;

at least one ear projecting from the structural member;

a bell crank including a first arm pivotally connected to the ear, a second arm pivotally connected to the upper rear end of one of the side walls, and a third arm; and fluid powered cylinder means connected to the third arm of the bell crank for actuation to pivot the tailgate relative to the discharge opening.

6. A dump bed comprising:

a floor;

front and side walls extending from the floor for cooperation therewith to define the front portion of the dump bed;

the opposite sides of the rear end of the floor being inwardly tapered and the rear ends of the side walls being upwardly tapered;

opposed rear corner walls extending between the tapered portions of the floor and the side walls to define the inner portion of a discharge chute located at the rear portion of the dump bed;

the rear corner walls each having an inwardly tapered rear edge and the floor including a central portion extending between the bottoms of the rear edges of the rear corner walls to define a discharge opening;

a series of interconnected flanges extending generally rearwardly from the rear edges of the corner walls and the floor to define the outer portion of the discharge chute;

a tailgate having a configuration substantially identical to that of the discharge opening; and means for selectively pivoting the tailgate at least between positions wherein the discharge chute is fully closed and wherein the discharge chute is fully open.

7. The dump bed according to claim 6 further characterized by means for selectively locking the tailgate at positions between the fully open and fully closed positions.

8. The dump bed according to claim 7 wherein the tailgate further comprises a pair of ears extending from the opposite sides of the upper end of the tailgate, and wherein the tailgate pivoting means further comprises a pair of links pivotally interconnecting the upper corners of the side walls and the upper corners of the tailgate, and a pair of bell cranks each including a first arm pivotally connected to one of the ears of the tailgate, a second arm pivotally connected to the upper end of the adjacent side wall, and a third arm, and further including fluid powered cylinder means interconnecting the side wall and the third arm of the bell crank, whereby the cylinder means is effective to selectively pivot the tailgate in an elliptical path and thereby open and close the discharge chute.

9. A dump bed comprising:

a floor having a rear end including inwardly tapered side portions extending to a transversely extending central portion;

side walls extending from the floor and each comprising an upwardly tapered rear end; and a pair of downwardly, inwardly and forwardly tapered rear corner walls each extending between the upwardly tapered rear end of one of the side walls and the adjacent tapered portion of the floor;

said rear corner walls extending to spaced apart rear edges positioned substantially inwardly from the side walls and aligned with the central portion of the rear end of the floor for cooperation therewith to define a discharge opening at the rear portion of the dump bed.

10. The dump bed according to claim 9 further including a tailgate having a configuration substantially identical to that of the discharge opening and means supporting the tailgate for pivotal movement into alignment with the discharge chute whereby the tailgate cooperates with the rear corner panels to substantially close the rear end of the dump bed.

11. The dump bed according to claim 10 further including tailgate pivoting means comprising at least one fluid powered cylinder adapted for selective actuation to pivot the tailgate between open and closed positions and to lock the tailgate in selected intermediate positions.

12. The dump bed according to claim 9 further including a plurality of flanges secured to the rear edges of the rear corner walls and to the central portion of the rear end of the floor at the discharge opening and extending generally rearwardly therefrom.

13. In a dump bed of the type including a discharge opening and a tailgate adapted to close the discharge opening, apparatus for selectively pivoting the tailgate relative to the discharge opening which comprises:

a pair of links pivotally connected to opposed upper portions of the dump bed and to the opposite upper ends of the tailgate;

a pair of ears extending outwardly from the opposite upper ends of the tailgate;

a pair of bell cranks pivotally connected to the ears and the opposed upper portions of the dump bed at points separated from the connections of the link thereto; and fluid powered cylinder means connected between the dump bed and the bell cranks for selective actuation to move the tailgate along an elliptical path.

* * * * *